US012783543B2

(12) United States Patent
Mandapaka et al.

(10) Patent No.: US 12,783,543 B2
(45) Date of Patent: Nov. 3, 2026

(54) SYSTEM AND METHOD FOR DATABASE MIGRATION

(71) Applicant: Crowley Government Services, Inc., Jacksonville, FL (US)

(72) Inventors: Bhaskar Mandapaka, Toronto (CA); Neil Athavale, Jacksonville, FL (US); Anoop Mohandas, St. Johns, FL (US); Srilakshmi Mallampalli, Jacksonville, FL (US); Chris Wolfl, St. Johns, FL (US); Ashwani Dev, Jacksonville, FL (US); Shashank Panchangam, Fulshear, TX (US); Smijith Kunhiraman, Jacksonville, FL (US)

(73) Assignee: Crowley Government Services, Inc., Jacksonville, FL (US)

( * ) Notice: Subject to any disclaimer, the term of this patent is extended or adjusted under 35 U.S.C. 154(b) by 0 days.

(21) Appl. No.: 19/084,352

(22) Filed: Mar. 19, 2025

(65) Prior Publication Data

US 2025/0298810 A1 Sep. 25, 2025

Related U.S. Application Data

(60) Provisional application No. 63/567,257, filed on Mar. 19, 2024.

(51) Int. Cl.
*G06F 16/25* (2019.01)
*G06F 16/21* (2019.01)

(52) U.S. Cl.
CPC .......... *G06F 16/258* (2019.01); *G06F 16/211* (2019.01); *G06F 16/214* (2019.01)

(58) Field of Classification Search
CPC ..... G06F 16/258; G06F 16/211; G06F 16/214
USPC .......................................................... 707/809
See application file for complete search history.

(56) References Cited

U.S. PATENT DOCUMENTS

| | | | | |
|---|---|---|---|---|
| 6,665,677 | B1 * | 12/2003 | Wotring | G06F 16/258 |
| 2002/0143755 | A1 * | 10/2002 | Wynblatt | G06F 16/2471 |
| 2015/0363458 | A1 * | 12/2015 | Cline | G06F 16/2365 707/638 |
| 2021/0182237 | A1 * | 6/2021 | Beyer | G06F 16/116 |
| 2025/0013703 | A1 * | 1/2025 | Saitwal | G06F 16/9536 |
| 2025/0094611 | A1 * | 3/2025 | Bell | G06F 21/6245 |

* cited by examiner

*Primary Examiner* — Cam Y T Truong
(74) *Attorney, Agent, or Firm* — Michele V. Frank; Venable LLP

(57) ABSTRACT

Systems, methods, and computer-readable storage media for database migration, and more specifically to systems and methods for enabling transfer of data between databases with different schema. A system can receive a request to transfer data from a first database to a second database, where the first database and the second database have distinct schema. The system can generate, via an entity relationship mapping algorithm text descriptions of how data is stored in the first database and how data is stored in the second database. Then, using a natural language processing (NLP) based large language model (LLM), the system can process the text descriptions to generate a database mapping, the database mapping identifying how information in the first database corresponds to the second database. The system can then transfer the data from the first database to the second database using the database mapping.

19 Claims, 4 Drawing Sheets

FIG. 6

Start

602: receiving, at a computer system, a request to transfer data from a first database to a second database, wherein the first database and the second database comprise at least one distinction such that a direct transfer of the data from the first database to the second database cannot occur 604: generating, via an entity relationship mapping algorithm executed by at least one processor of the computer system, a first text description of first entity relationships, the first entity relationships identifying how data is stored in the first database 606: generating, via the entity relationship mapping algorithm executed by the at least one processor, a second text description of second entity relationships, the second entity relationships identifying how data is stored in the second database 608: generating, via the at least one processor using a natural language processing (NLP) based large language model (LLM) to process the first text description with the second text description, a database mapping, wherein the database mapping identifies how information in the first database corresponds to the second database 610: transferring, via the at least one processor and the database mapping, the data from the first database to the second database using the database mapping according to the request End

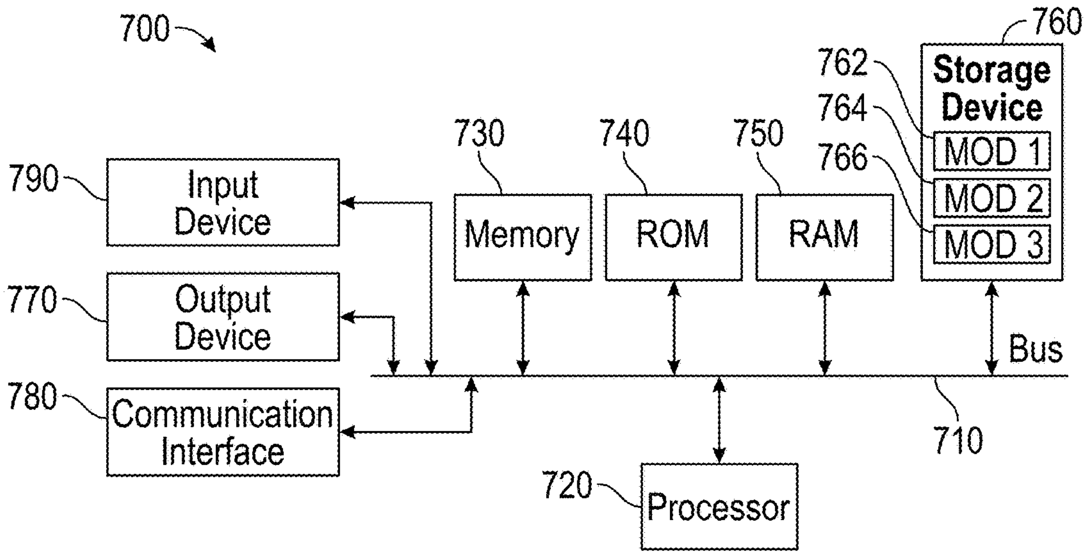

FIG. 7

SYSTEM AND METHOD FOR DATABASE MIGRATION

CROSS-REFERENCE TO RELATED APPLICATIONS

This application claims the benefit of U.S. Provisional Patent Application No. 63/567,257, filed on Mar. 19, 2024, the entire contents of which is hereby incorporated by reference in its entirety.

BACKGROUND

1. Technical Field

The present disclosure relates to database migration, and more specifically to systems and methods for enabling transfer of data between databases with different schema.

2. Introduction

In a database migration, you move data from source databases to target databases. Database migration is an integral part of any tool migration. There are two main steps in this process: Mapping the database fields and converting old database queries to new database queries. Present methods for mapping the database fields and converting old database queries to new database queries lack efficiency.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include: receiving, at a computer system, a request to transfer data from a first database to a second database, wherein the first database and the second database comprise at least one distinction such that a direct transfer of the data from the first database to the second database cannot occur; generating, via an entity relationship mapping algorithm executed by at least one processor of the computer system, a first text description of first entity relationships, the first entity relationships identifying how data is stored in the first database; generating, via the entity relationship mapping algorithm executed by the at least one processor, a second text description of second entity relationships, the second entity relationships identifying how data is stored in the second database; generating, via the at least one processor using a natural language processing (NLP) based large language model (LLM) to process the first text description with the second text description, a database mapping, wherein the database mapping identifies how information in the first database corresponds to the second database; and transferring, via the at least one processor and the database mapping, the data from the first database to the second database using the database mapping according to the request.

A system configured to perform the concepts disclosed herein can include: receiving a request to transfer data from a first database to a second database, wherein the first database and the second database comprise at least one distinction such that a direct transfer of the data from the first database to the second database cannot occur; generating, by executing an entity relationship mapping algorithm, a first text description of first entity relationships, the first entity relationships identifying how data is stored in the first database; generating, by executing the entity relationship mapping algorithm, a second text description of second entity relationships, the second entity relationships identifying how data is stored in the second database; generating, using a natural language processing (NLP) based large language model (LLM) to process the first text description with the second text description, a database mapping, wherein the database mapping identifies how information in the first database corresponds to the second database; and transferring, using the database mapping, the data from the first database to the second database using the database mapping according to the request.

A non-transitory computer-readable storage medium configured as disclosed herein can have instructions stored which, when executed by at least one processor, cause the at least one processor to perform operations which include: receiving a request to transfer data from a first database to a second database, wherein the first database and the second database comprise at least one distinction such that a direct transfer of the data from the first database to the second database cannot occur; generating, by executing an entity relationship mapping algorithm, a first text description of first entity relationships, the first entity relationships identifying how data is stored in the first database; generating, by executing the entity relationship mapping algorithm, a second text description of second entity relationships, the second entity relationships identifying how data is stored in the second database; generating, using a natural language processing (NLP) based large language model (LLM) to process the first text description with the second text description, a database mapping, wherein the database mapping identifies how information in the first database corresponds to the second database; and transferring, using the database mapping, the data from the first database to the second database using the database mapping according to the request.

BRIEF DESCRIPTION OF THE DRAWINGS

FIG. 6 illustrates an example method embodiment; and

FIG. 7 illustrates an example computer system.

DETAILED DESCRIPTION

Figure 1:
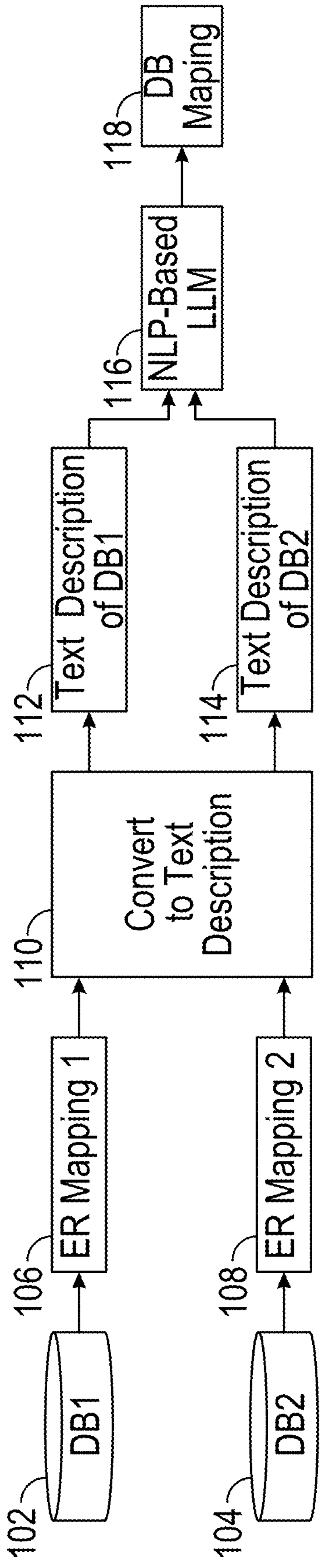
FIG. 1 illustrates an example of mapping database migration using entity relationships.

Various embodiments of the disclosure are described in detail below. While specific implementations are described, this is done for illustration purposes only. Other components and configurations may be used without parting from the spirit and scope of the disclosure.

A database schema refers to the logical and visual configuration of an entire relational database. Database objects are often grouped and displayed as tables, functions, and relations. A schema describes the organization and storage of data in the database and defines the relationship between various tables.

When migrating data from one database to another, or adding an already populated database to an existing set of databases, any differences in the fields, attributes, or other settings between databases can result in errors if one attempts to directly transfer the data, and a costly/time-intensive process if one attempts to map the databases. The mapping of databases, at present, requires a user to identify the fields/attributes of data as they exist in both databases, determine how those fields/attributes relate to one another, and generate a process for how to transfer the data from one database to another. Alternatively, if both databases are to remain accessible, a user must generate a process which adapts common commands to a specific database.

Systems configured as described herein can, using a combination of Natural Language Processing (NLP) and Large Language Models (LLM), execute processes which result in migrating data between databases which have distinct schema and/or for generating a global schema for communicating with databases which have distinct schema. This is accomplished by generating text descriptions of how each of the respective database's schema are arranged, then inputting the text descriptions into the NLP LLM, with the result being a database to database mapping. LLMs are based on the GPT (Generative Pre-trained Transformer) architecture. It leverages a vast amount of text data to understand and generate human-like responses. Using deep learning techniques, specifically transformer models, it learns patterns, contexts, and relationships in text. When prompted with input, it predicts the most probable sequence of words to generate coherent and contextually relevant responses, employing attention mechanisms to understand and generate text based on the context provided.

To create the text descriptions of the respective database's schema, the system can rely on entity relationship models. Entity relationship ("ER") models identify the relationships between types of data within a relational database. For example, a database could have a first record as illustrated in Example Record 1:

| Example Record 1 |
| --- |
| Customer |
| Phone Number<br>Customer Number<br>Name<br>Address |

The ER model/diagram can also be expressed as text. For example: The customer table (as shown in Example Record 1) can have the four illustrated attributes: phone number, customer number, name, and address. However, the customer number could be the primary key for this table. In some configurations, the entity relationship model can be in the form of a graph (i.e., nodes with edges connecting the various fields), whereas in other configurations the entity relationship model can be in a particular format or data configuration.

A different database may have a similar, but different way of recording the same information, such as the record illustrated in Example Record 2:

| Example Record 2 |
| --- |
| Contact |
| First Name<br>Last Name<br>Home Address<br>Work Address<br>Mobile Phone<br>Work Phone |

While the records of the respective databases are similar, they are not identical, which can lead to formatting issues if one were to try and merge the databases, or if one were to try to move data from one database to the other. Moreover, just because field names may be similar does not mean that they operate identically, or that data stored in those fields is equivalent.

Systems configured as disclosed herein can create text descriptions of predefined entity relationships (whether manually created by users/database managers, or created automatically via an algorithm). Alternatively, systems configured as disclosed herein can create text descriptions based on the tables and attributes of a given database. Using the generated text descriptions, the system can enter those text descriptions into the NLP-based LLM (as discussed above), resulting in the database-database mapping. In the examples provided above, the text description of Example Record 1 might read: Customer: Phone Number, Customer Number, Name, Address. The text description of Example Record 2 might read: Contact: First Name, Last Name, Home Address, Work Address, Mobile Phone, Work Phone.

In some configurations, such as where no entity relationships are provided, or where the tables and attributes of a database are unorganized or otherwise unusable, the system can generate a list of the tables and attributes of each database, use test/dummy data to determine where data input to the systems is stored, then combine the resulting fields, resulting in the database-database mapping. For example, if each database has a User Interface (UI) through which users can enter data, the system can generate a large set of test/dummy data (or use pre-generated test/dummy data), and enter the same data into both databases. The system can then map where the data input into each respective database is stored, with the result being a database-database map identifying where data from each database would be stored in the other database.

Consider the following example. A shipment that needs to be sent urgently from Jacksonville to Atlanta. That shipment has a shipment ID, urgent destination document information, etc. A user would enter all this shipment information into a system using a user interface, and the system would save the shipment information in a file. However, in this case, there is a second system which saves the same data in a different file format, and rather than manually entering the test/dummy data, the system enters the data automatically through the user interfaces for both databases. Now that same data is stored in two different databases because these two are completely two different tools, with two different data sets. But since the data entered into both was identical, the system can execute a script to determine that a field in one database is equivalent to a particular field in the other database. Because of the common data the system can connect fields from both databases and map them as equivalents. When all of the equivalent fields between the databases are identified, the database-database mapping is completed.

In some configurations, the system can use the text descriptions of databases to create a token, with the ability to retain content. This tokenization with content retention can, for example be done through a program which converts data to a vector representation, such as (but not limited to) WORD2VEC, resulting in word embeddings/tokens. The system can then execute a similarity-based token search on the resulting tokens, and feed the output of that similarity-based search to a LLM. Because tokens are fundamental units of text, employing a tokenization process to break down input text into smaller units can be based on predefined rules. For example, the tokens can correspond to words, sub-words, and/or characters, and can be mapped to indices within a fixed vocabulary. Each token can be transformed into dense numerical representations called embeddings, learned during the model's training. These embeddings capture the relationships and patterns between tokens using mechanisms like self-attention and positional encodings. During text generation or prediction, the model can process these token embeddings, generating output tokens that correspond to words or sub-words in the model's vocabulary. Overall, tokens serve as the basis for the model's understanding, processing, and generation of text, enabling coherent and contextually relevant language generation. The output of the LLM can then be combined to form the database-database mapping.

Where there are multiple databases, each with its own tools/schema, creating a database-database mapping between each database may be inefficient. If each database is considered a node, and the database-database mapping between new databases is considered an edge, then creating a new database-database mapping between all databases results in an excessively large computing time each time a new database is added. If, for example (and following the complete graph math regarding the total number of edges in a complete graph equaling $(N*(N-1))/2$, where N is the number of nodes), two databases require only a single database-database mapping, but four databases requires six database-database mappings, and ten databases requires forty-five database-database mappings.

Instead, in such circumstances, systems configured as disclosed herein can generate a global schema. With a global schema, each database is mapped to a common schema, such that database-database mappings are not used. In this configuration, a first mapping from a first database to the global schema is created, then a second mapping from a second database to the global schema is created. If/when data needs to be transferred between the first database and the second database, the system can then use the global schema as a medium, allowing transfer of the data from the first database to the second database using the first database to the global schema mapping and the global schema to second database mapping.

FIG. 1 illustrates an example of mapping database migration using entity relationships. In this example, there are two databases (DBs), DB 1 102 and DB 2 104, each with their own respective ER (Entity Relationship) mapping 106, 108 which each define the database schema a database 102, 104. The ER mappings 106, 108 are preferably generated by the system using an algorithm which traces data connections between different field-types within the database. Alternatively, the ER mappings 106, 108 can be generated by users, such as engineers or database managers. In this example, the system converts 110 the ER mappings 106, 108 to text descriptions 112, 114. The system then uses a Natural Language Processing (NLP)-based Large Language Model (LLM) 116 to convert the text descriptions 112, 114 into a database (DB) mapping 118, the DB mapping defining how DB1 102 relates to DB2 104 and vice versa.

Figure 2:
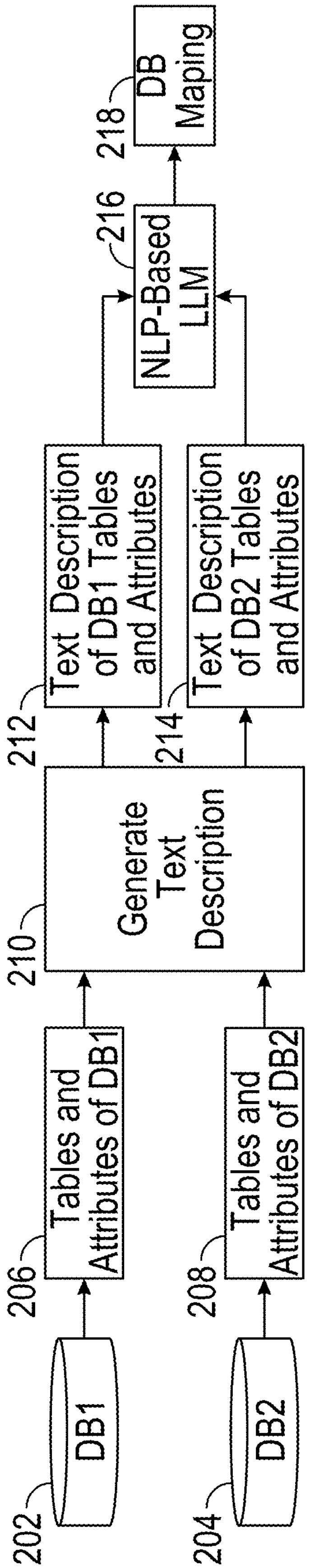
FIG. 2 illustrates; an example of mapping database migration using database tables and attributes.

FIG. 2 illustrates; an example of mapping database migration using database tables and attributes. In this example, there are again two databases 202, 204, however in this example the system uses tables and attributes 206, 208 of the databases, rather than ER mappings. ER models/diagrams can be made manually by the data base administrators (or via automatic mechanisms) and are very comprehensive about all the relationships in the DB. The list of tables and attributes for FIG. 2 are lists that can be created by the end users of the database in an organization (or via automatic mechanisms).

This list usually has only the attributes that are most commonly used by the power users. The system generates 210 text descriptions 212, 214 of database tables and attributes (by sending and receiving data to/from the LLM), then enters the resulting descriptions 212, 214 into a NLP-based LLM 216 which converts the text descriptions 212, 214 into a DB mapping 218, the DB mapping defining how DB 1 202 relates to DB2 204 and vice versa.

Figure 3:
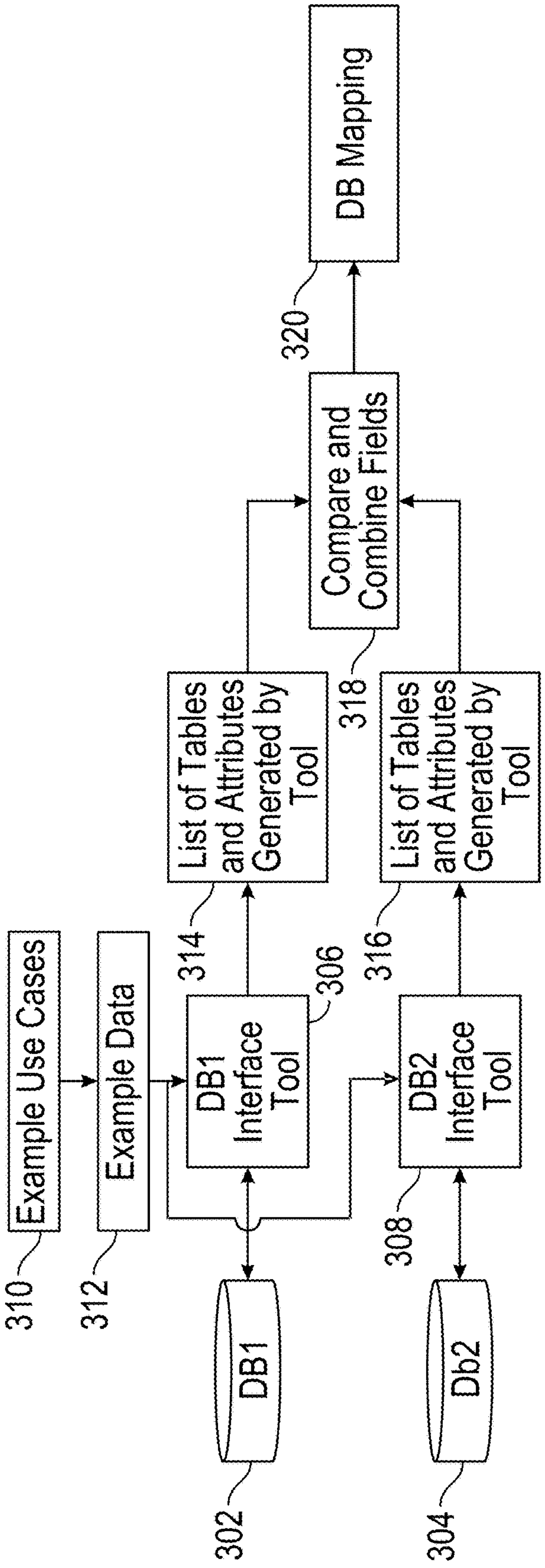
FIG. 3 illustrates an example of mapping database migration using dummy data.

FIG. 3 illustrates an example of mapping database migration using dummy data. In this example, the system has two databases (DB 1 302, DB2 304), and is not provided any data identifying how the database schema operate (i.e., no ER mapping, no listing of tables and attributes, etc.). Instead, the system identifies different use cases 310 for how one would use the databases 302, 304, and generates example data 312 for each of those use cases 310. The system then enters that same example data 312 into both database 302, 304 using database interface tools 306, 308 (e.g., user interface tools or other systems for entering data into the specific databases). Once the example data 312 is entered into the respective databases 302, 304, the system can identify where within each database 302, 304 the example data was stored, thereby generating a list of tables and attributes of each database 314, 316. The system can then compare and combine the fields 318, looking for similarities between the generated lists of tables and attributes 314, 316, resulting in a DB mapping 320 identifying how DB 1 302 relates to DB 2 304 and vice versa.

Figure 4:
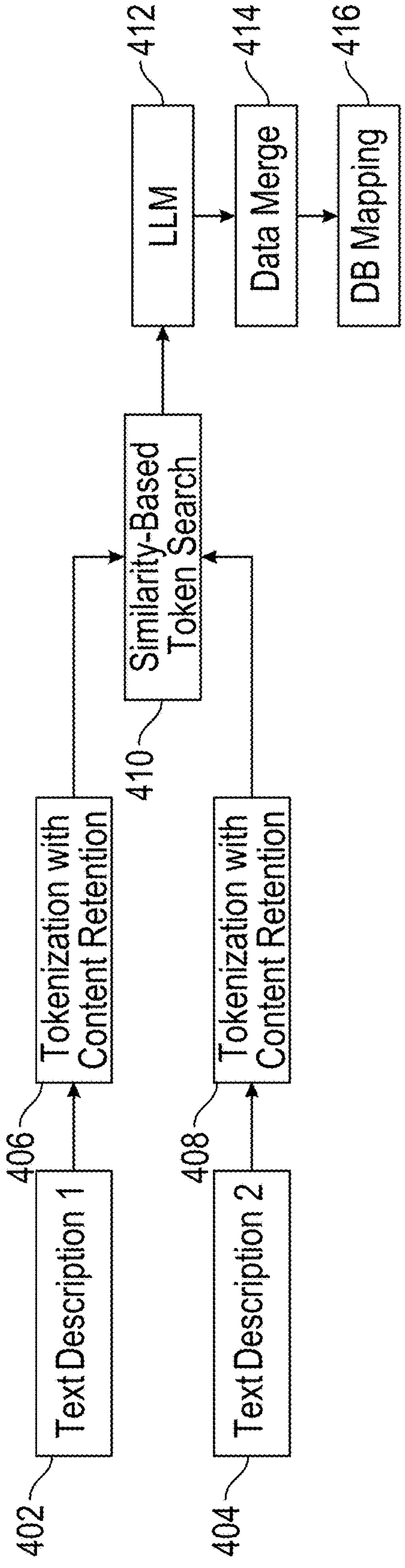
FIG. 4 illustrates an example of mapping database migration using tokenization.

FIG. 4 illustrates an example of mapping database migration using tokenization. In this example, the system is provided with text descriptions 402, 404 regarding how a database store data. In this example, the text descriptions 402, 404 may be generated based on ER mappings (such as illustrated in FIG. 1) and/or generated based on tables and attributes (such as illustrated in FIG. 2). The system performs tokenization with content retention 406, 408 using the text descriptions 402, 404, generating tokens (aka embeddings, vectors, or other numerical representations). Unlike a hash algorithm, this tokenization converts the text descriptions into comparable values. The system then performs a similarity-based token search 410 on the respective tokens. The similarity-based token search 410 returns the relevant tokens, and the results of that similarity search 410 are sent to an LLM 412. The results of the LLM 414 are then used as a DB mapping 416, mapping how data from the respective databases relate to one another.

Figure 5:
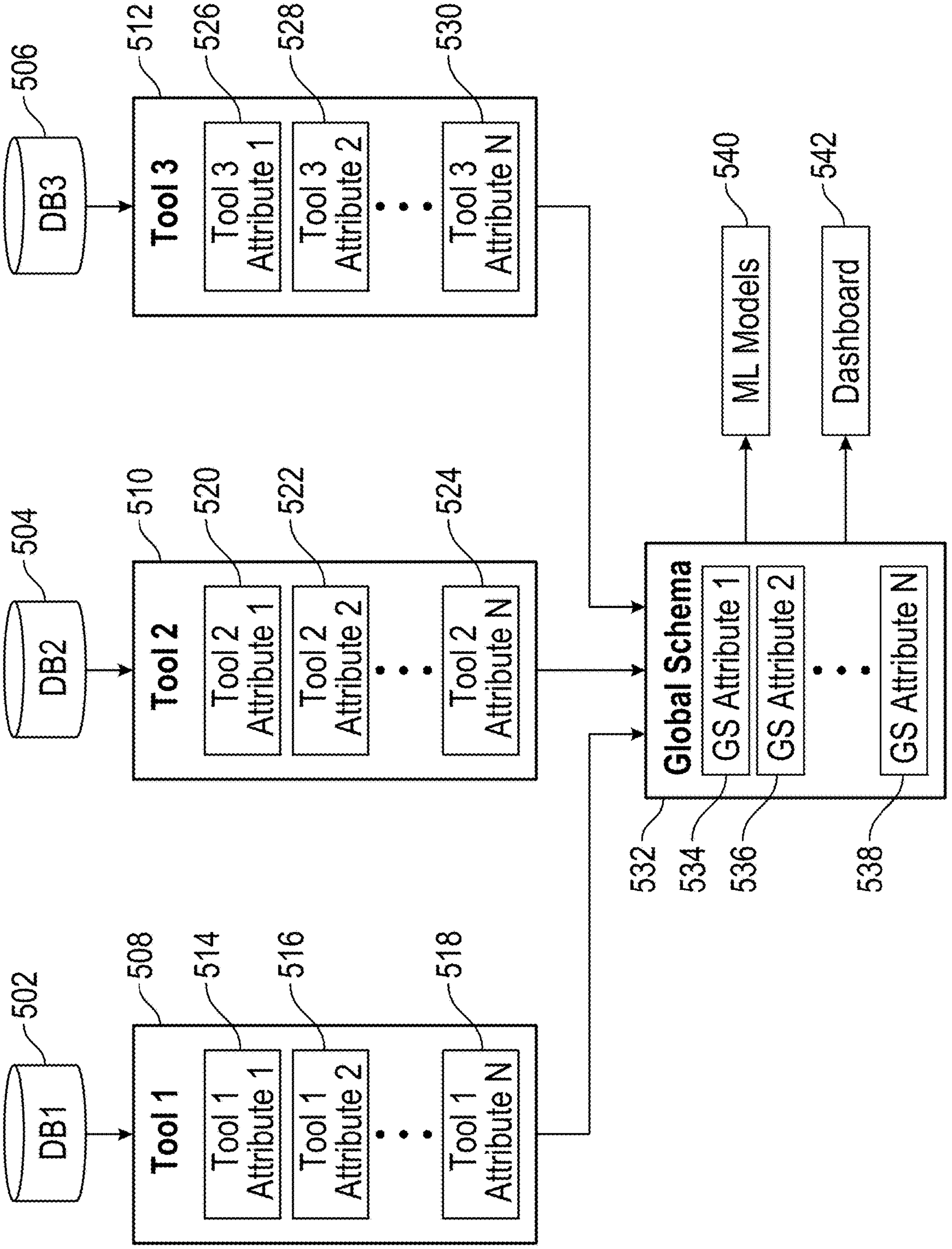
FIG. 5 illustrates an example of generating a global schema for database migration.

FIG. 5 illustrates an example of generating a global schema 532 for database migration. In this example, there are multiple databases 502, 504, 506, each with their respective tools 508, 510, 512. Each tool 508, 510, 512 has attributes which define how data within the corresponding database is stored. Thus, tool 1 508 has attributes 514, 516, 518, which define how data entered into the tool 508 will be stored in database 1 502. Likewise, tool 2 510 has attributes 520, 522, 524 which define how data entered into the tool 510 will be stored in database 2 504, and tool 3 512 has attributes 526, 528, 530 which define how data entered into the tool 512 will be stored in database 3 506.

In this example, rather than generate a database-database mapping, the system has a global schema 532, with its own attributes 534, 536, 538. Using the global schema 532, users can enter data (or requests for data) using a common format on a common dashboard 542, then the system can convert that data or data request into the format needed by the desired database. This conversion is done by having a mapping between each database tool 508, 510, 512 and the global schema 532. In addition, the system can generate machine learning (ML) models 540 based on the global schema, and the machine learning models 540 can be used when mapping additional databases to the global schema 532. FIG. 5, the ML models 540 shows are consuming that data. For example, in an exemplary Transport Management Database, these ML models 540 can do load recommendation or freight price prediction.

FIG. 6 illustrates an example method embodiment. As illustrated, a system can receive a request to transfer data from a first database to a second database, wherein the first database and the second database comprise at least one distinction such that a direct transfer of the data from the first database to the second database cannot occur (602), then generate, via an entity relationship mapping algorithm executed by at least one processor of the computer system, a first text description of first entity relationships, the first entity relationships identifying how data is stored in the first database (604). The system can then generate, via the entity relationship mapping algorithm executed by the at least one processor, a second text description of second entity relationships, the second entity relationships identifying how data is stored in the second database (606), and generate, via the at least one processor using a natural language processing (NLP) based large language model (LLM) to process the first text description with the second text description, a database mapping, wherein the database mapping identifies how information in the first database corresponds to the second database (608). The system can then transfer, via the at least one processor and the database mapping, the data from the first database to the second database using the database mapping according to the request (610).

In some configurations, the NLP-based LLM can be executed by a third party. For example, the NLP-based LLM can be CHATGPT.

In some configurations, the at least one distinction can be different names for fields.

In some configurations, the at least one distinction can be distinct fields.

In some configurations, the illustrated method can further include: generating, via the at least one processor using the database mapping, a global schema for: saving data to the first database and the second database; and retrieving data from the first database and the second database, wherein when a user enters a command for a given database using the global schema, the at least one processor converts the command from the global schema to a format needed by the given database. In such configurations, the converting of the command from the global schema to the format needed by the given database occurs via machine learning.

With reference to FIG. 7, an exemplary system includes a computing device 700 (such as a general-purpose computing device), including a processing unit (CPU or processor) 720 and a system bus 710 that couples various system components including the system memory 730 such as read-only memory (ROM) 740 and random access memory (RAM) 750 to the processor 720. The computing device 700 can include a cache of high-speed memory connected directly with, in close proximity to, or integrated as part of the processor 720. The computing device 700 copies data from the system memory 730 and/or the storage device 760 to the cache for quick access by the processor 720. In this way, the cache provides a performance boost that avoids processor 720 delays while waiting for data. These and other modules can control or be configured to control the processor 720 to perform various actions. Other system memory 730 may be available for use as well. The system memory 730 can include multiple different types of memory with different performance characteristics. It can be appreciated that the disclosure may operate on a computing device 700 with more than one processor 720 or on a group or cluster of computing devices networked together to provide greater processing capability. The processor 720 can include any general-purpose processor and a hardware module or software module, such as module 1 762, module 2 764, and module 3 766 stored in storage device 760, configured to control the processor 720 as well as a special-purpose processor where software instructions are incorporated into the actual processor design. The processor 720 may essentially be a completely self-contained computing system, containing multiple cores or processors, a bus, memory controller, cache, etc. A multi-core processor may be symmetric or asymmetric.

The system bus 710 may be any of several types of bus structures including a memory bus or memory controller, a peripheral bus, and a local bus using any of a variety of bus architectures. A basic input/output (BIOS) stored in memory ROM 740 or the like, may provide the basic routine that helps to transfer information between elements within the computing device 700, such as during start-up. The computing device 700 further includes storage devices 760 such as a hard disk drive, a magnetic disk drive, an optical disk drive, tape drive or the like. The storage device 760 can include software modules 762, 764, 766 for controlling the processor 720. Other hardware or software modules are contemplated. The storage device 760 is connected to the system bus 710 by a drive interface. The drives and the associated computer-readable storage media provide nonvolatile storage of computer-readable instructions, data structures, program modules and other data for the computing device 700. In one aspect, a hardware module that performs a particular function includes the software component stored in a tangible computer-readable storage medium in connection with the necessary hardware components, such as the processor 720, system bus 710, output device 770 (such as a display or speaker), and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the computing device 700 is a small, handheld computing device, a desktop computer, or a computer server.

Although the exemplary embodiment described herein employs the storage device 760 (such as a hard disk), other types of computer-readable media which can store data that are accessible by a computer, such as magnetic cassettes, flash memory cards, digital versatile disks, cartridges, random access memories (RAMs) 750, and read-only memory (ROM) 740, may also be used in the exemplary operating environment. Tangible computer-readable storage media, computer-readable storage devices, or computer-readable memory devices, expressly exclude media such as transitory waves, energy, carrier signals, electromagnetic waves, and signals per sc.

To enable user interaction with the computing device 700, an input device 790 represents any number of input mechanisms, such as a microphone for speech, a touch-sensitive screen for gesture or graphical input, keyboard, mouse, motion input, speech and so forth. An output device 770 can also be one or more of a number of output mechanisms known to those of skill in the art. In some instances, multimodal systems enable a user to provide multiple types of input to communicate with the computing device 700. The communications interface 780 generally governs and manages the user input and system output. There is no restriction on operating on any particular hardware arrangement and therefore the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. For example, unless otherwise explicitly indicated, the steps of a process or method may be performed in an order other than the example embodiments discussed above. Likewise, unless otherwise indicated, various components may be omitted, substituted, or arranged in a configuration other than the example embodiments discussed above.

Further aspects of the present disclosure are provided by the subject matter of the following clauses.

A method comprising: receiving, at a computer system, a request to transfer data from a first database to a second database, wherein the first database and the second database comprise at least one distinction such that a direct transfer of the data from the first database to the second database cannot occur; generating, via an entity relationship mapping algorithm executed by at least one processor of the computer system, a first text description of first entity relationships, the first entity relationships identifying how data is stored in the first database; generating, via the entity relationship mapping algorithm executed by the at least one processor, a second text description of second entity relationships, the second entity relationships identifying how data is stored in the second database; generating, via the at least one processor using a natural language processing (NLP) based large language model (LLM) to process the first text description with the second text description, a database mapping, wherein the database mapping identifies how information in the first database corresponds to the second database; and transferring, via the at least one processor and the database mapping, the data from the first database to the second database using the database mapping according to the request.

The method of any previous clause, wherein the NLP-based LLM is executed by a third party.

The method of any previous clause, wherein the NLP-based LLM is CHATGPT.

The method of any previous clause, wherein the at least one distinction comprises different names for fields.

The method of any previous clause, wherein the at least one distinction comprises distinct fields.

The method of any previous clause, further comprising: generating, via the at least one processor using the database mapping, a global schema for: saving data to the first database and the second database; and retrieving data from the first database and the second database, wherein when a user enters a command for a given database using the global schema, the at least one processor converts the command from the global schema to a format needed by the given database.

The method of any previous clause, wherein converting of the command from the global schema to the format needed by the given database occurs via machine learning.

A system comprising: at least one processor; and a non-transitory computer-readable storage medium having instructions stored which, when executed by the at least one processor, cause the at least one processor to perform operations comprising: receiving a request to transfer data from a first database to a second database, wherein the first database and the second database comprise at least one distinction such that a direct transfer of the data from the first database to the second database cannot occur; generating, by executing an entity relationship mapping algorithm, a first text description of first entity relationships, the first entity relationships identifying how data is stored in the first database; generating, by executing the entity relationship mapping algorithm, a second text description of second entity relationships, the second entity relationships identifying how data is stored in the second database; generating, using a natural language processing (NLP) based large language model (LLM) to process the first text description with the second text description, a database mapping, wherein the database mapping identifies how information in the first database corresponds to the second database; and transferring, using the database mapping, the data from the first database to the second database using the database mapping according to the request.

The system of any previous clause, wherein the NLP-based LLM is executed by a third party.

The system of any previous clause, wherein the NLP-based LLM is CHATGPT.

The system of any previous clause, wherein the at least one distinction comprises different names for fields.

The system of any previous clause, wherein the at least one distinction comprises distinct fields.

The system of any previous clause, the non-transitory computer-readable storage medium having additional instructions stored which, when executed by the at least one processor, cause the at least one processor to perform operations comprising: generating, using the database mapping, a global schema for: saving data to the first database and the second database; and retrieving data from the first database and the second database, wherein when a user enters a command for a given database using the global schema, the at least one processor converts the command from the global schema to a format needed by the given database.

The system of any previous clause, wherein converting of the command from the global schema to the format needed by the given database occurs via machine learning.

A non-transitory computer-readable storage medium having instructions stored which, when executed by at least one processor, cause the at least one processor to perform operations comprising: receiving a request to transfer data from a first database to a second database, wherein the first database and the second database comprise at least one distinction such that a direct transfer of the data from the first database to the second database cannot occur; generating, by executing an entity relationship mapping algorithm, a first text description of first entity relationships, the first entity relationships identifying how data is stored in the first database; generating, by executing the entity relationship mapping algorithm, a second text description of second entity relationships, the second entity relationships identifying how data is stored in the second database; generating, using a natural language processing (NLP) based large language model (LLM) to process the first text description with the second text description, a database mapping, wherein the database mapping identifies how information in the first database corresponds to the second database; and transferring, using the database mapping, the data from the first database to the second database using the database mapping according to the request.

The non-transitory computer-readable storage medium of any previous clause, wherein the NLP-based LLM is executed by a third party.

The non-transitory computer-readable storage medium of any previous clause, wherein the NLP-based LLM is CHATGPT.

The non-transitory computer-readable storage medium of any previous clause, wherein the at least one distinction comprises different names for fields.

The non-transitory computer-readable storage medium of any previous clause, wherein the at least one distinction comprises distinct fields.

The non-transitory computer-readable storage medium of any previous clause, having additional instructions stored which, when executed by the at least one processor, cause the at least one processor to perform operations comprising: generating, using the database mapping, a global schema for: saving data to the first database and the second database; and retrieving data from the first database and the second database, wherein when a user enters a command for a given database using the global schema, the at least one processor converts the command from the global schema to a format needed by the given database.

We claim:

1. A method comprising:

receiving, at a computer system, a request to transfer data from a first database to a second database, wherein the first database and the second database comprise at least one distinction such that a direct transfer of the data from the first database to the second database cannot occur;

generating, via an entity relationship mapping algorithm executed by at least one processor of the computer system, a first text description of first entity relationships, the first entity relationships identifying how data is stored in the first database;

generating, via the entity relationship mapping algorithm executed by the at least one processor, a second text description of second entity relationships, the second entity relationships identifying how data is stored in the second database;

transforming, via the at least one processor executing a data to vector representation transformation algorithm, the first text description to a first database mapping of the first database and the second text description to a second database mapping of the second database, wherein the transforming of the first text description and the second text description further comprises generating a first plurality of tokens and a second plurality of tokens, each token in the first plurality of tokens and the second plurality of tokens comprising a vector embedding representing a portion of the first text description or the second text description;

generating, via the at least one processor using a natural language processing (NLP) based large language model (LLM) to process the first database mapping with the second database mapping, a database-database mapping, wherein the database-database mapping identifies how information in the first database corresponds to the second database, wherein the generating of the database-database mapping further comprises:

performing a similarity-based token search between the first plurality of tokens and the second plurality of tokens to identify a subset of tokens having similarity exceeding a threshold; and processing, via the NLP-based LLM, only the subset of tokens to generate the database-database mapping; and transferring, via the at least one processor and the database-database mapping, the data from the first database to the second database using the database-database mapping according to the request.

2. The method of claim 1, wherein the NLP-based LLM is executed by a third party.

3. The method of claim 1, wherein the at least one distinction comprises different names for fields.

4. The method of claim 1, wherein the at least one distinction comprises distinct fields.

5. The method of claim 1, further comprising:

generating, via the at least one processor using the database mapping, a global schema for:

saving data to the first database and the second database; and retrieving data from the first database and the second database, wherein when a user enters a command for a given database using the global schema, the at least one processor converts the command from the global schema to a format needed by the given database.

6. The method of claim 5, wherein converting of the command from the global schema to the format needed by the given database occurs via machine learning.

7. A system comprising:

at least one processor; and a non-transitory computer-readable storage medium having instructions stored which, when executed by the at least one processor, cause the at least one processor to perform operations comprising:

receiving a request to transfer data from a first database to a second database, wherein the first database and the second database comprise at least one distinction such that a direct transfer of the data from the first database to the second database cannot occur;

generating, by executing an entity relationship mapping algorithm, a first text description of first entity relationships, the first entity relationships identifying how data is stored in the first database;

generating, by executing the entity relationship mapping algorithm, a second text description of second entity relationships, the second entity relationships identifying how data is stored in the second database;

transforming, by executing a data to vector representation transformation algorithm, the first text description to a first database mapping of the first database and the second text description to a second database mapping of the second database, wherein the transforming of the first text description and the second text description further comprises generating a first plurality of tokens and a second plurality of tokens, each token in the first plurality of tokens and the second plurality of tokens comprising a vector embedding representing a portion of the first text description or the second text description;

generating, using a natural language processing (NLP) based large language model (LLM) to process the first database mapping with the second database mapping, a database-database mapping, wherein the database-database mapping identifies how information in the first database corresponds to the second database, wherein the generating of the database-database mapping further comprises:

performing a similarity-based token search between the first plurality of tokens and the second plurality of tokens to identify a subset of tokens having similarity exceeding a threshold; and processing, via the NLP-based LLM, only the subset of tokens to generate the database-database mapping; and transferring, using the database-database mapping, the data from the first database to the second database using the database-database mapping according to the request.

8. The system of claim 7, wherein the NLP-based LLM is executed by a third party.

9. The system of claim 8, wherein the NLP-based LLM is CHATGPT.

10. The system of claim 7, wherein the at least one distinction comprises different names for fields.

11. The system of claim 7, wherein the at least one distinction comprises distinct fields.

12. The system of claim 7, the non-transitory computer-readable storage medium having additional instructions stored which, when executed by the at least one processor, cause the at least one processor to perform operations comprising:

generating, using the database mapping, a global schema for:

saving data to the first database and the second database; and retrieving data from the first database and the second database, wherein when a user enters a command for a given database using the global schema, the at least one processor converts the command from the global schema to a format needed by the given database.

13. The system of claim 12, wherein converting of the command from the global schema to the format needed by the given database occurs via machine learning.

14. A non-transitory computer-readable storage medium having instructions stored which, when executed by at least one processor, cause the at least one processor to perform operations comprising:

receiving a request to transfer data from a first database to a second database, wherein the first database and the second database comprise at least one distinction such that a direct transfer of the data from the first database to the second database cannot occur;

generating, by executing an entity relationship mapping algorithm, a first text description of first entity relationships, the first entity relationships identifying how data is stored in the first database;

generating, by executing the entity relationship mapping algorithm, a second text description of second entity relationships, the second entity relationships identifying how data is stored in the second database;

transforming, by executing a data to vector representation transformation algorithm, the first text description to a first database mapping of the first database and the second text description to a second database mapping of the second database, wherein the transforming of the first text description and the second text description further comprises generating a first plurality of tokens and a second plurality of tokens, each token in the first plurality of tokens and the second plurality of tokens comprising a vector embedding representing a portion of the first text description or the second text description;

generating, using a natural language processing (NLP) based large language model (LLM) to process the first database mapping with the second database mapping, a database-database mapping, wherein the database-database mapping identifies how information in the first database corresponds to the second database, wherein the generating of the database-database mapping further comprises:

performing a similarity-based token search between the first plurality of tokens and the second plurality of tokens to identify a subset of tokens having similarity exceeding a threshold; and processing, via the NLP-based LLM, only the subset of tokens to generate the database-database mapping; and transferring, using the database-database mapping, the data from the first database to the second database using the database-database mapping according to the request.

15. The non-transitory computer-readable storage medium of claim 14, wherein the NLP-based LLM is executed by a third party.

16. The non-transitory computer-readable storage medium of claim 15, wherein the NLP-based LLM is CHATGPT.

17. The non-transitory computer-readable storage medium of claim 14, wherein the at least one distinction comprises different names for fields.

18. The non-transitory computer-readable storage medium of claim 14, wherein the at least one distinction comprises distinct fields.

19. The non-transitory computer-readable storage medium of claim 14, having additional instructions stored which, when executed by the at least one processor, cause the at least one processor to perform operations comprising:

generating, using the database mapping, a global schema for:

saving data to the first database and the second database; and retrieving data from the first database and the second database, wherein when a user enters a command for a given database using the global schema, the at least one processor converts the command from the global schema to a format needed by the given database.

* * * * *